(12) United States Patent
Devireddy et al.

(10) Patent No.: US 11,095,557 B2
(45) Date of Patent: Aug. 17, 2021

(54) L3 UNDERLAY ROUTING IN A CLOUD ENVIRONMENT USING HYBRID DISTRIBUTED LOGICAL ROUTER

(71) Applicant: VMware, Inc., Palo Alto, CA (US)

(72) Inventors: Dileep Devireddy, San Jose, CA (US); Ankit Parmar, Santa Clara, CA (US); Subin Cyriac Mathew, San Jose, CA (US); Ritesh Tiwari, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 67 days.

(21) Appl. No.: 16/575,638

(22) Filed: Sep. 19, 2019

(65) Prior Publication Data

US 2021/0092057 A1    Mar. 25, 2021

(51) Int. Cl.
*H04L 12/741* (2013.01)
*H04L 12/751* (2013.01)
*H04L 12/715* (2013.01)

(52) U.S. Cl.
CPC .............. *H04L 45/54* (2013.01); *H04L 45/02* (2013.01); *H04L 45/64* (2013.01)

(58) Field of Classification Search
CPC .......... H04L 45/54; H04L 45/02; H04L 45/64
See application file for complete search history.

(56) References Cited

U.S. PATENT DOCUMENTS

| | | | |
|---|---|---|---|
| 9,614,748 B1* | 4/2017 | Battersby | H04L 63/0272 |
| 10,374,878 B2 | 8/2019 | Yadav et al. | |
| 2014/0006585 A1* | 1/2014 | Dunbar | H04L 41/00 709/223 |
| 2018/0062993 A1 | 3/2018 | Wu et al. | |
| 2020/0236041 A1* | 7/2020 | Yu | H04L 12/4633 |

OTHER PUBLICATIONS

International Search Report and Written Opinion for International Application No. PCT/US2020/051320, dated Dec. 16, 2020.

* cited by examiner

*Primary Examiner* — Duc C Ho
(74) *Attorney, Agent, or Firm* — Patterson + Sheridan, LLP

(57) ABSTRACT

The disclosure provides an approach for overcoming the limitations of a cloud provider network when a data center with software-defined network and multiple hosts, each with multiple virtual machines, operates on the cloud provider network. Single-host aware routers and a multiple-host aware distributed router are combined into a hybrid router in each host. The hybrid router receives a route table from the control plane of the data center and updates the received table based on the locations of VMs, such as edge VMs and management VAs on each of the hosts. An agent in each host also updates a router in the cloud provider network based on the locations of the virtual machines on the hosts. Thus, the hybrid routers maintain local routing information and global routing information for the virtual machines on the hosts in the data center.

20 Claims, 9 Drawing Sheets

L3 UNDERLAY ROUTING IN A CLOUD ENVIRONMENT USING HYBRID DISTRIBUTED LOGICAL ROUTER

BACKGROUND

Software defined networking (SDN) comprises a plurality of hosts in communication over a physical network infrastructure of a data center (e.g., on-premise data center or a cloud data center), each host having one or more virtualized endpoints such as virtual machines (VMs), containers, or other virtual computing instances (VCIs). These VCIs may be connected across the multiple hosts in a manner that is decoupled from the underlying physical network infrastructure, which is often a layer 3 (L3) network that uses IP addressing. In one example, the VCIs may be connected to logical overlay networks that may span multiple hosts and are decoupled from the underlying physical network infrastructure.

SDN involves the use of a management plane (MP) and a control plane (CP). The management plane is responsible for receiving network configuration input from, for example, an administrator and generating desired state data that specifies how the logical network should be implemented in the physical infrastructure.

The control plane is responsible for determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) and/or virtual router(s) provided by the hypervisor (i.e., virtualization software) deployed on each host. An example control plane logical network controller is described in U.S. Pat. No. 9,525,647 titled "Network Control Apparatus and Method for Creating and Modifying Logical Switching Elements," which is fully incorporated herein by reference.

For example, any arbitrary set of VMs in a datacenter may be placed in communication across a logical Layer 2 link by connecting them to a logical switch. Each logical switch corresponds to a virtual network identifier (VNI). The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. A logical router is collectively implemented by at least one virtual router on each host that has a VM or virtual switch connected to the logical router.

SDNs described above have many capabilities, one of which is the ability to accommodate the movement of VMs from one host to another host, where the VMs may be those dedicated to management workloads and those dedicated to compute workloads.

A difficulty arises however when a flexible SDN, as described above, is introduced into the public cloud infrastructure because while the public cloud provider offers Layer 3 (L3) connectivity, its Layer 2 (L2) capabilities are limited. For example, one cloud provider only allows a fixed number of L2 addresses for a given interface of the network of the public cloud provider and does not provide for self-learning of L2 addresses within the SDN for L2 links to which the VMs are connected. Thus, when the VMs need to be moved from a current host to a different host or when the network needs to be checked for duplicate function VMs, the cloud provider network does not have the proper information for routing traffic from one VM to a VM that has been moved.

It is desirable to maintain the flexibility in an SDN of moving VMs from one host to another host in spite of the restrictions placed on the L3 and L2 infrastructure by the cloud provider.

DETAILED DESCRIPTION

One embodiment of the Layer 3 (L3) underlay routing solution described herein provides a method of managing route tables in a data center, where the route tables provide next hop routing for logical routers of an overlay network and a router or routers in an underlay network to which the data center is connected. The data center includes a number of hosts, each of which supports a number of virtual compute instances such as virtual machines or virtual appliances. In the method, a control plane receives from each of the hosts IP addresses for the locations of the various compute instances on each of the hosts and generates a route table that includes entries that provide that the next hop is to the underlay network router. The control plane then transmits the generated route table to all of the hosts in the data center. Upon receiving the generated route table, each host then decides whether to overwrite an entry based on whether a virtual compute instance is present on (i.e., local to) the host. Each host also updates an entry in the route table for the underlay router so that the underlay router routes virtual compute instance destination traffic to the host that contains the virtual compute instance.

Further embodiments include a computer system configured to carry out one or more aspects of the above method, and a non-transitory computer-readable storage medium containing computer-readable code executable by one or more computer processors to carry out one or more aspects of the above method.

Figure 1:
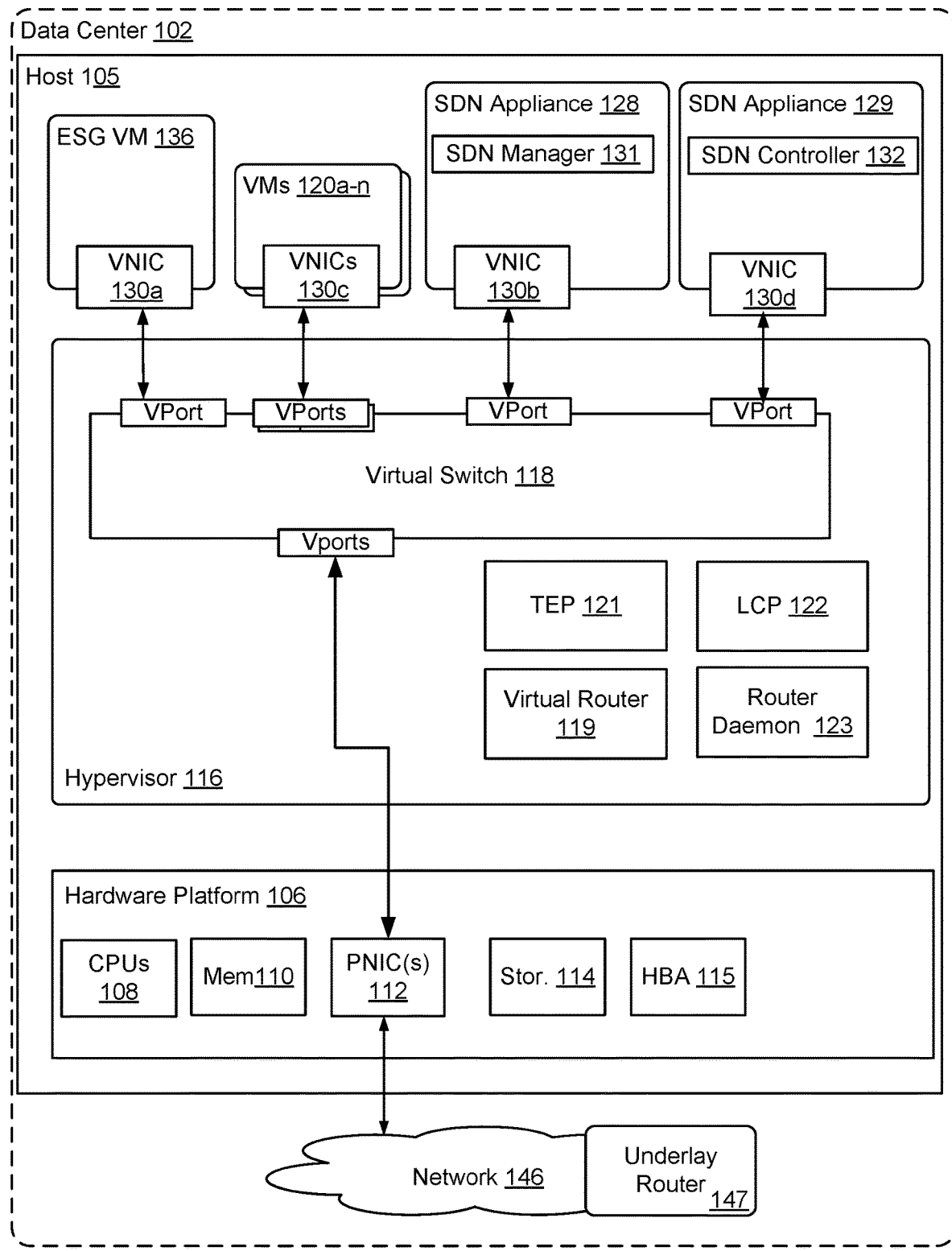
FIG. 1 illustrates a networking environment within which embodiments of the present disclosure may be implemented.

FIG. 1 depicts a block diagram of a host 105 that has been configured with an SDN solution. Host 105 is part of a data center 102, which may be an on-premises data center or a cloud data center. Although not shown, data center 102 includes other hosts that, in some examples, are interconnected using network 146, such as a local area network (LAN). Network 146 serves as the physical underlay network of data center 102 with underlay router 147. Hosts 105 in data center 102 may be geographically co-located servers on the same rack or on different racks in any arbitrary location in data center 102.

In addition, data center 102 includes a management plane and a control plane. For example, as shown, the management plane in host 105 includes an SDN virtual appliance 128, which includes an SDN Manager 131. The control plane includes an SDN virtual appliance 129, which includes an SDN controller 132. The management plane is concerned with receiving network configuration input from an administrator or other entity via web or API interfaces and generating desired state data so that the control plane can determine one or more logical networks, including topologies, for data center 102. The control plane is concerned with determining the logical overlay network topology and maintaining information about network entities such as logical switches, logical routers, and endpoints, etc. The logical topology information received from the management plane is translated by the control plane into network configuration data that is then communicated to network elements of each host 105. The network configuration data, for example, includes forwarding table entries to populate forwarding tables at virtual switch(es), route tables at virtual router(s), etc. provided by the hypervisor deployed on each host 105, and configuration information such as Layer 2 (MAC) addresses for interfaces such as VNICs and virtual interfaces, etc. The management plane and control plane each may be implemented as single entities or may be implemented as distributed or clustered applications or components. For example, a management plane may include multiple computing devices or VCIs that implement management plane functions, and a control plane may include multiple central (or distributed) controller computers, VCIs, or processes that implement control plane functions.

Host 105 is configured to provide a virtualization layer, also referred to as a hypervisor 116, which abstracts processor, memory, storage, and networking resources of hardware platform 106 into multiple virtual machines, e.g., VM 120. VMs on the same host 105 may run concurrently. VMs 120a-n, in one example, are referred to as compute resources that execute a workload, such as web applications, etc.

The hypervisor architecture may vary. In some embodiments, virtualization software can be installed as system-level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system-level software as well as a "Domain 0" or "Root Partition" virtual machine, which is a privileged machine that has access to the physical hardware resources of the host. Although parts of the disclosure are described with reference to VMs, the teachings herein also apply to other types of VCIs, such as containers, Docker containers, data compute nodes, isolated user-space instances, namespace containers, and the like.

Host 105 may be constructed on a server-grade hardware platform 106, such as an x86 architecture platform. Hardware platform 106 of host 105 may include components of a computing device such as one or more processors (CPUs) 108, system memory 110, physical network interface controller (PNIC) 112, storage system 114, a local host bus adapter (HBA) 115, and other I/O devices such as, for example, USB interfaces (not shown). Each CPU 108 is configured to execute instructions, for example, instructions that perform one or more operations described herein, and that are stored in system memory 110 and in storage system 114. PNIC 112 enables host 105 to communicate with other devices via a communication medium, such as the links in network 146 that connect hosts in data center 102 and/or an external network.

Storage system 114 represents local persistent storage devices (e.g., one or more hard disks, flash memory modules, solid-state disks, and/or optical disks). Host bus adapter (HBA) 115 couples host 105 to one or more external storage networks (not shown), such as a storage area network (SAN) or distributed virtual SAN. Other external storage networks that may be used include network-attached storage (NAS) and other network data storage systems, which are accessible via PNIC 112. System memory 110 is hardware for storing and retrieving information, such as executable instructions, configurations, and other data. System memory 110 contains programs and data when CPUs 108 are actively using them. System memory 110 may be volatile memory or non-volatile memory.

As stated above, FIG. 1 shows host 105 in a state that is illustrative of host 105 being configured with an SDN solution. Configuring host 105 with an SDN solution allows VMs 120 to communicate as part of logical overlay networks which are logical networks that use a packet encapsulation technology, such as VXLAN, to decouple links from the underlying physical network infrastructure and which may span multiple hosts located within data center 102 or outside of data center 102. Configuring host 105 with the SDN solution involves the deployment of a number of components, such as SDN Manager 131 and SDN controller 132, among other components that are not shown.

SDN Manager 131 implements management plane functions and may be one of multiple SDN managers executing on various hosts in data center 102 that together implement the functions of the management plane in a distributed manner. SDN controller 132 implements control plane functions and may be one of multiple SDN controllers executing on various hosts in data center 102 that together implement the functions of the control plane in a distributed manner. In certain aspects, an SDN manager and an SDN controller may execute as processes on different VMs, as shown in FIG. 1 and on the same or different hosts. In some embodiments, both SDN Manager 131 and SDN controller 132 can execute as processes in a single SDN virtual appliance (VA), say SDN VA 128, which is an example of a management VA that is configured to run such components.

A management VA may be different from a workload VM (e.g., VMs 120*a-n*). A workload VM 120*a-n* is part of the data plane of the SDN and is configured to communicate data over a logical overlay network. A management VA 128, 129 is configured to manage the logical overlay network. Accordingly, a management VA 128, 129 may not be part of the overlay network itself and thus packets sent to or received from management VA 128, 129 are not subject to VXLAN encapsulation. In certain aspects, a management VA may be a type of virtual machine (VM). For example, a virtual appliance may be a VM that is not part of the overlay network itself.

A gateway device provides VMs 120*a-n* on host 105 and other components in data center 102 with connectivity to a network (not shown) that is external to data center 102 (e.g., a direct link, a local area network (LAN), a wide area network (WAN) such as the Internet, another type of network, or a combination of these). For example, the gateway device may manage external public IP addresses for VMs 120 and route incoming traffic to and outgoing traffic from data center 102. The gateway device may also provide other networking services, such as firewalls, network address translation (NAT), dynamic host configuration protocol (DHCP), and load balancing. In the example of FIG. 1, the gateway device is implemented as a VCI (e.g., VM), that is configured to execute on host 105, which is shown as edge services gateway (ESG) VM 136. It should be noted that ESG VM 136, though shown on the same host as SDN Manager 131 and SDN controller 132 in FIG. 1, may be on a different host.

Hypervisor 116 includes a virtual router 119, one or more virtual switches 118, a tunnel endpoint (TEP) 121, a router daemon 123, and a local control plane (LCP) 122.

Virtual router 119 and virtual switch(es) 118 are modules in hypervisor 116 that serve as software-based interfaces between PNIC 112 and other physical resources available on host 105 and a number of components including SDN virtual appliances 128, 129, ESG VM 136, VMs 120*a-n*, and/or other management VAs (not shown). In some embodiments, virtual router 119 and/or virtual switch(es) 118 are distributed virtual routers and/or distributed virtual switches. As a distributed entity, multiple instances of the distributed virtual router/switch on multiple hosts may be configured and managed as a single router or switch. Each instance may be connected to a different PNIC 112. For example, the distributed virtual router/switch implemented on each host may share the same configuration across each host on which the distributed virtual router/switch is configured, and share state. The term, "virtual switch" is used herein to refer to both non-distributed virtual switches and distributed virtual switches and instances thereof. The term, "virtual router" is used herein to refer to both non-distributed virtual routers and distributed virtual routers and instances thereof.

Each of the VMs, such as VMs 120, ESG VM 136, and SDN virtual appliances 128, 129, running on host 105 may include a virtual network interface controller (VNIC), such as VNIC 130*a-*130*d*, which is responsible for forwarding L2 frames between VMs 120 via hypervisor 116. VNICs 130*a-d* is a virtualization of a PNIC type device. Further, each of the VMs is connected to a virtual port (vport) provided by a virtual switch, such as virtual switch 118. For example, ESG VM 136, SDN virtual appliance 128, VMs 120, and SDN virtual appliance 129 connect to vports provided by virtual switch 118, though VMs 120 often connect to a separate switch (not shown).

In certain aspects, virtual router 119 is configured to perform L3 routing within host 105. For example, virtual router 119 may be configured with route tables to route packets based on the destination IP address included in the packets. For example, if the destination IP address of a packet corresponds to a destination not on host 105, virtual router 119 may be configured to route the packet on an uplink vport to which PNIC 112 is coupled so that the packet is sent out of host 105 and further routed in network 146 to its destination. If the destination IP address of a packet corresponds to a destination on host 105, virtual router 119 may be configured to route the packet to a vport associated with the destination IP address. For example, virtual router 119 may be coupled to one or more virtual switches 118 (to which VMs are coupled) and/or directly to a VM via different vports of virtual router 119. Virtual router 119 may accordingly route the network layer packet to virtual switch 118 including the VM with the IP address corresponding to the destination IP address or to that VM directly.

TEP 121 is a hypervisor module that handles encapsulation and decapsulation of packets to TEPs on the overlay network. For example, as discussed, forwarding tables at virtual switch 118 instruct virtual switch 118 to encapsulate packets using TEP 121 for communication from a participating VM to another VM on the same logical link but on a different (destination) host.

Router daemon 123 is a hypervisor daemon responsible for updating route tables for virtual router 119.

LCP 122 is the agent that communications with the control plane in the data center 102.

Figure 2:
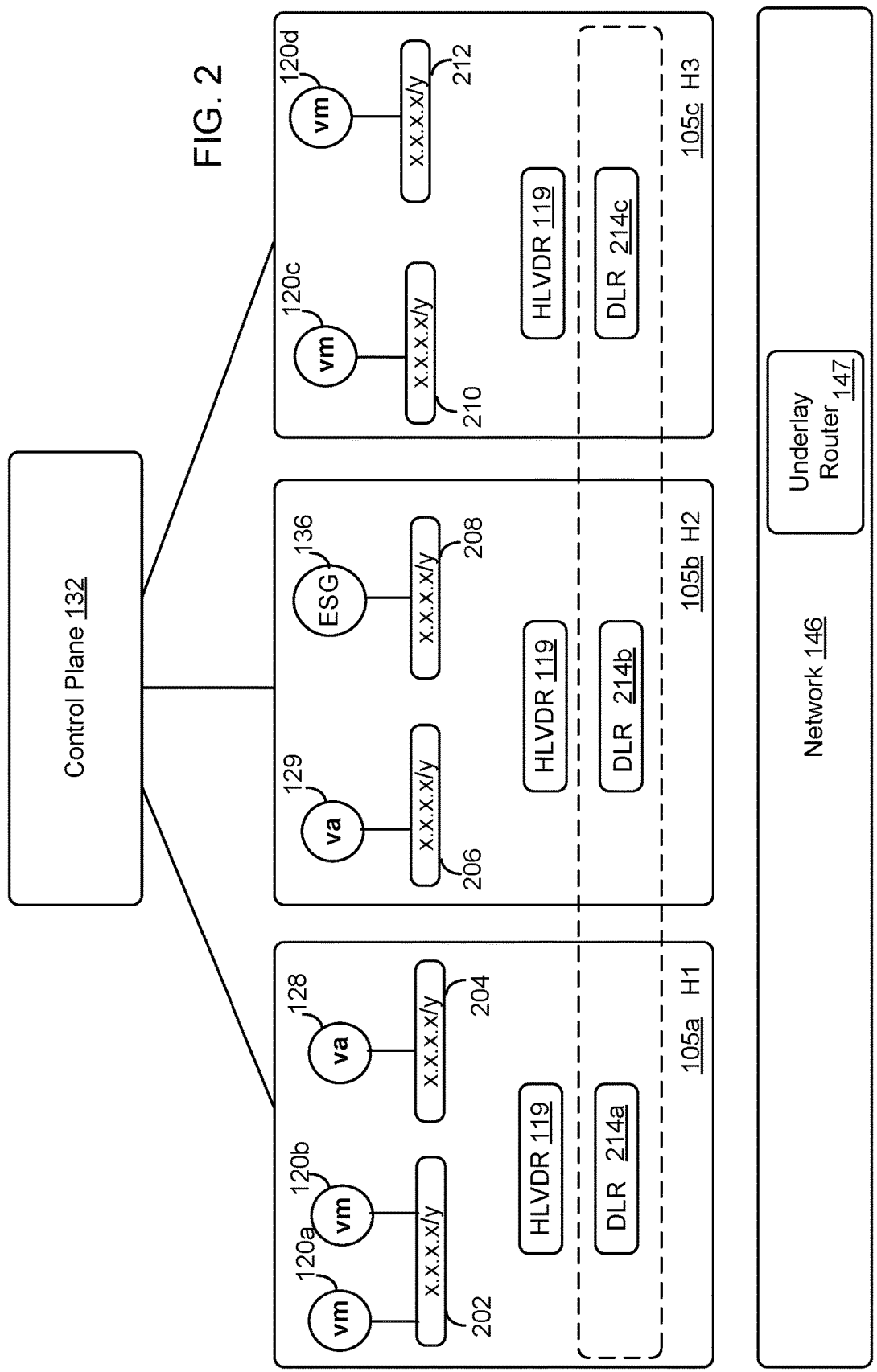
FIG. 2 depicts a physical view of various hosts, routers, and virtual machines in the data center, in the prior art.

FIG. 2 depicts a physical view of various hosts, routers, and virtual machines in the data center, in the prior art. Included in the figure are network 146, three hosts H1 105*a* (H1), H2 105*b*, H3 105*c*, which are instances of host 105 in FIG. 1, and a control plane 132 that includes a network controller. Network 146 may be provided by a cloud provider, such as a public cloud provider, e.g., Amazon Web Services. Each host H1-H3 105*a-c* includes one or more VCIs (e.g., VMs) residing on one or more virtual network segments, each of which is provided by the virtualization software in each host H1-H3 105*a-c*. In the figure, VMs 120*a-b* reside on subnet 202 in host H1 105*a* and virtual appliance (VA) 128 resides on subnet 204 in host H1 105*a*. VA 129 resides on subnet 206 in host H2 105*b* and ESG VM 136 resides on subnet 208 in host H2 105*b*. VM 120*c* resides on subnet 210 in host H3 105*c* and VM 120*d* resides on subnet 212 in host H3 105*c*. In the IPv4 paradigm, subnets are characterized by "x.x.x.x/y" where the prefix is controlled by the value y. For example, if y=24, then the prefix is the first 24 bits of the network address. A similar classless inter-domain routing (CIDR) mechanism is implemented in IPv6.

Also shown in FIG. 2 are a single host-aware or host-local virtual distributed router (HLVDR) 119 described above and a multiple host-aware distributed logical router (DLR) 214*a-c* (indicated by the dotted line around each of the DLRs). HLVDR 119 performs L3 routing within the host over the subnets in that host, while DLR 214*a-c* is an L3 logical router that performs routing in the logical overlay among hosts H1-H3 105*a-c*. In one embodiment, control plane 132 contains a cluster of fault-tolerant controllers that provide networking control functions for hosts H1-H3 105*a-c*, including configuring DLR 214*a-c*.

Figure 3:
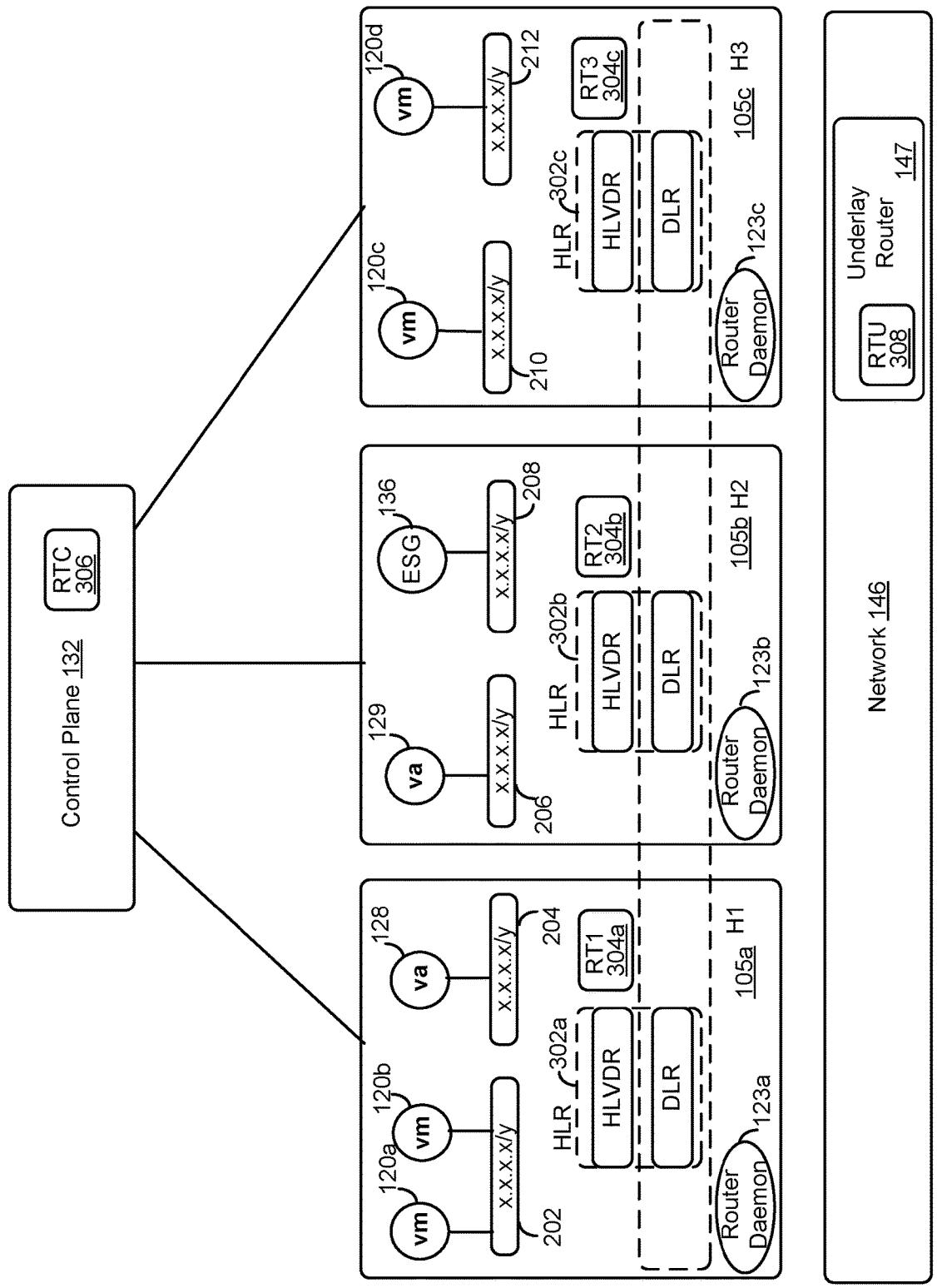
FIG. 3 depicts a physical view of various hosts with virtual machines including an edge services gateway (ESG) virtual machine, and routers in the data center, in an embodiment.

FIG. 3 depicts a physical view of various hosts with virtual machines, and routers in the data center, in an embodiment. As shown in FIG. 3, the HLVDR 119 and DLR 214*a-c* in each host are combined into a single entity called a hybrid logical router (HLR) 302a, 302b, 302c. Also shown in FIG. 3 are route table RTU 308 for network 146, router daemons 123a-c and route tables RT1 304a, RT2 304b and RT3 304c in each of the hosts H1-H3 105a-c and route table RTC 306 in the network controller in control plane 132. In particular, HLRs 302a-c are configured to route packets accordingly to route tables RT1-RT3 304a-c, respectively. Further, routers of the underlay, such as underlay router 147, are configured to route packets according to route table RTU 308. Operation of router daemons 123a-c, HLR 302a-c and route tables RT1-RT3 304a-c, RTC 306, RTU 308 is described in reference to FIGS. 4-8.

Figure 4:
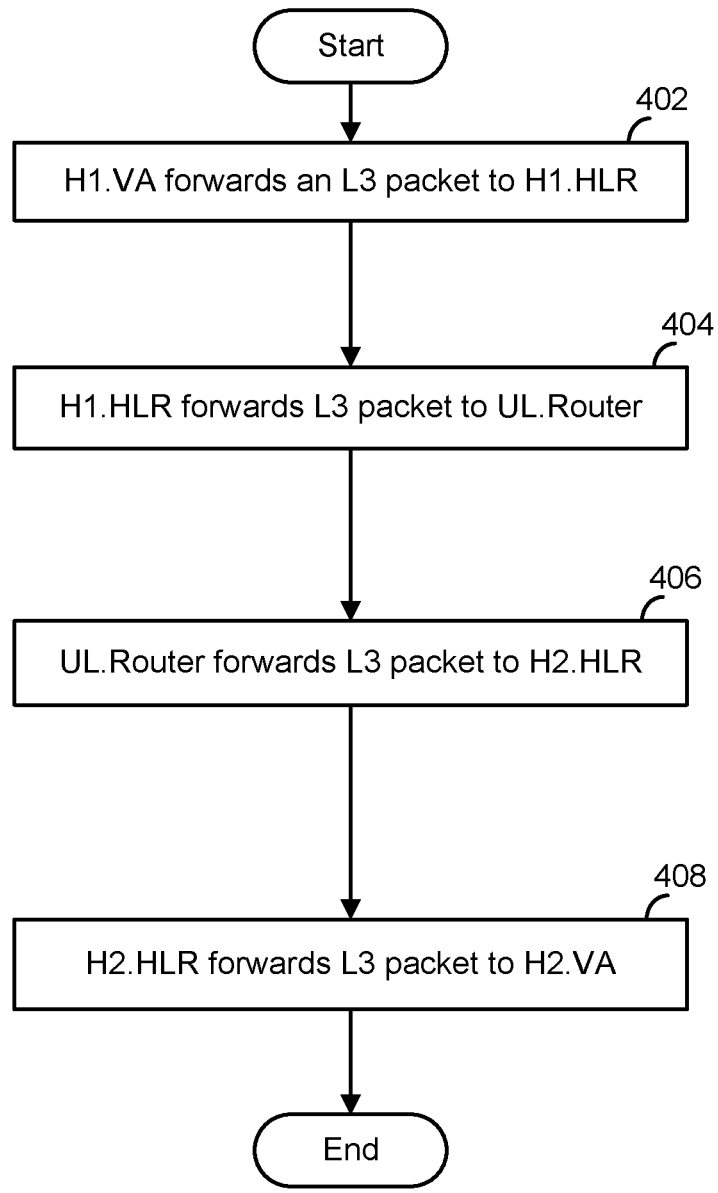
FIG. 4 depicts an example routing of an L3 packet between a source VM in host H1 and a destination VM in host H2, in an embodiment.

FIG. 4 depicts an example routing of an L3 packet between a source VM, such as VA 128, in host H1 and a destination VM, such as VA 129, in host H2, in an embodiment.

Steps 402-408 in FIG. 4 assume route tables RT1 304a, RT2 304b, and RTU 308 have been configured and all Address Resolution Protocol (ARP) learning has occurred.

In step 402, VA 128 in host H1 105a (H1.VA 128) is the source that sends an L3 packet, whose destination is VA 129 on H2 (H2.VA), to the HLR 302a on host H1 105a (H1.HLR 302a). Step 402 occurs when H1.VA 128 creates a new L3 packet, sends the L3 packet to VNIC 130b of VA 128 on H1 (H1.VA.VNIC 130b), H1.VA.VNIC 130b sends the L3 packet to VSWITCH 118 on H1 105a (H1.VSWITCH 118), and H1.VSWITCH 118 sends the L3 packet to HLR 302a on host H1 105a (H1.HLR 302a).

In step 404, H1.HLR 302a forwards the L3 packet via PNIC 112 on host H1 105a (H1.PNIC 112) to underlay router (UL.Router) 147 using routing table RT1 304a. Step 404 occurs because, according to RT1 304a, the destination IP address is not on host H1 105a.

In step 406, UL.Router 147 forwards the L3 packet to H2.HLR 302b using route table RTU 308. Step 406 occurs when UL.Router 147 receives the L3 packet from host H1 105a over an underlay link, sends the L3 packet over an underlay link to host H2 105b, H2.PNIC receives the L3 packet and sends it to H2.HLR 302b via the H2.VSWITCH.

In step 408, H2.HLR 302b forwards the L3 packet to destination H2.VA 129 using RT2 304b. Step 408 occurs when H2.HLR 302b sends the packet to the H2.VSWITCH, the H2.VSWITCH forwards the packet to the H2.VA.VNIC, and the H2.VA.VNIC forwards the packet to destination H2.VA 129.

In one embodiment, the source VM and the destination VM are on the same VLAN. In VLAN, groups of devices are isolated into broadcast domains with the VLAN being assigned to an IP subnet and all hosts having unique IP addresses with that subnet. Thus, subnet 204 and subnet 206 can be subnets of the same VLAN.

In another example, the source VM and the destination VM are on the same logical L2 (e.g., coupled to the same logical switch) and are part of a logical overlay network. For example, VM 120a and VM 120c have the same VNI. To route between VM 120a and VM 120b requires use of a TEP, which performs packet encapsulation and packet decapsulation with an outer header. The outer header includes an outer IP header and an outer L2 header. The outer IP header includes the IP address of source TEP and the IP address of the destination TEP. The outer L2 header is based on routing lookup on the outer IP header using regular L3 lookup protocols. Thus, encapsulated packets are routed as L2 frames over network 146 between TEPs without network 146 being aware of the inner payload of the L2 frames.

Figure 5:
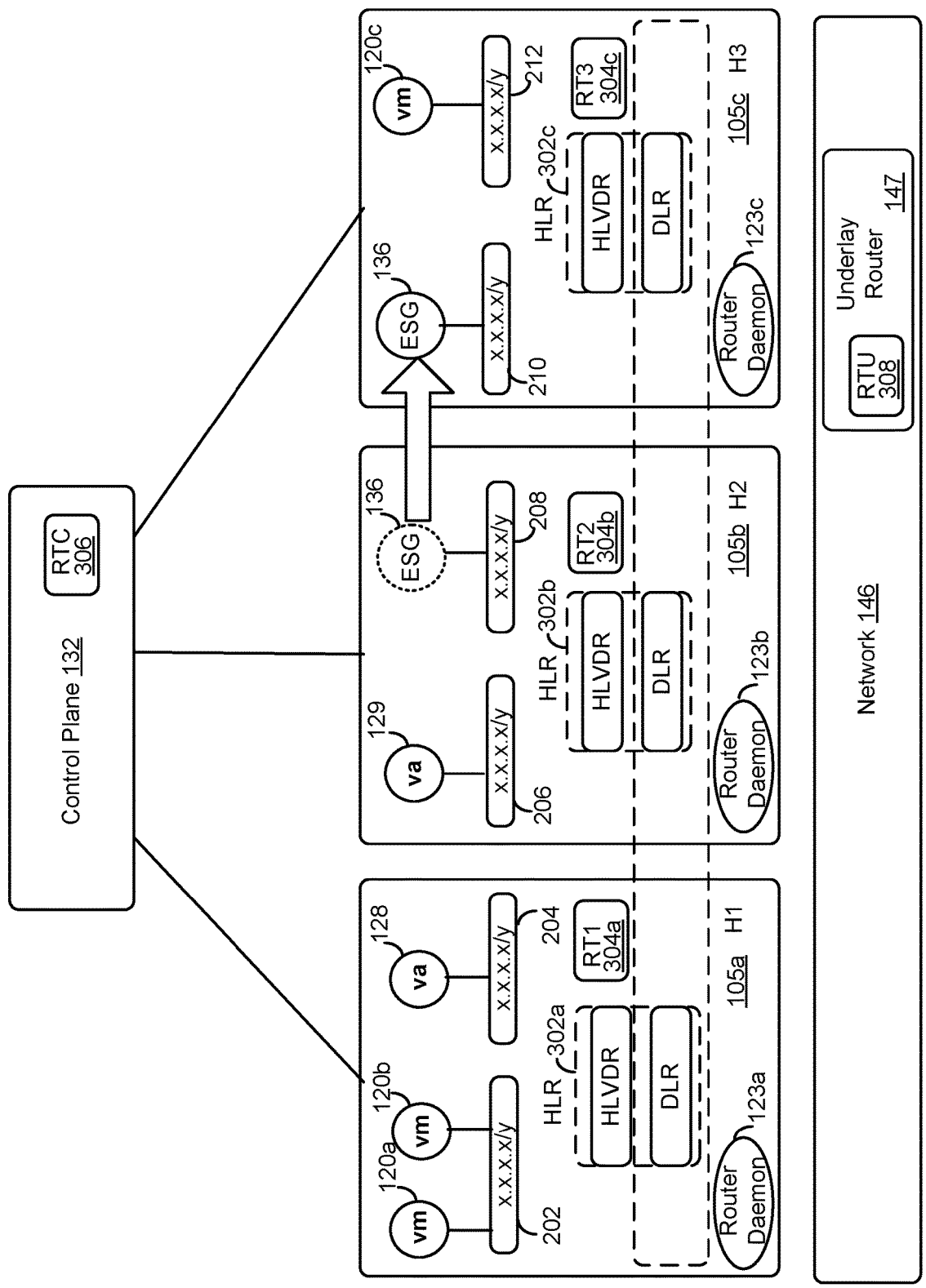
FIG. 5 depicts a physical view of various hosts with movement of an ESG virtual machine in the data center, in an embodiment.

FIG. 5 depicts a physical view of various hosts with movement of ESG VM 136 in the data center, in an embodiment. As shown in the figure, ESG VM 136 is moved from host H2 105b to host H3 105c and thus resides not only on a different host but also on a different subnet 210 in host H3 105c. Thus, the L2 address (MAC address) of ESG VM 136 is now associated with the different subnet. As explained above, network 146 does not self-learn that the MAC address of ESG VM 136 is now associated with the different subnet.

Figure 6:
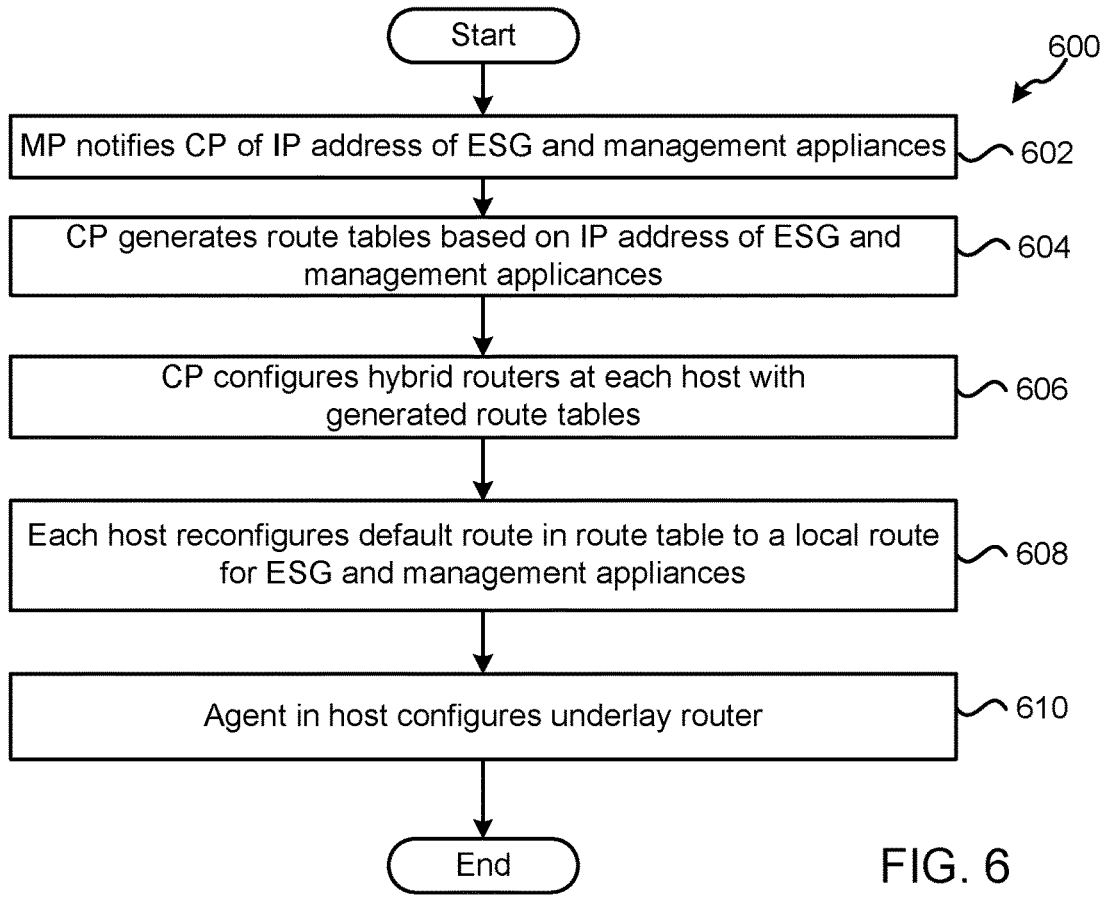
FIG. 6 depicts a flow of operations for configuring a route table for each of the hosts.

FIG. 6 depicts a flow of operations 600 for configuring a route table for each of the hosts. In step 602, the management plane (e.g., SDN Manager 131), notifies control plane 132 of the IP addresses of ESG VM 136 and any virtual appliances 128, 129.

In step 604, control plane (CP) 132 generates a route table RTC 306 based on the IP address of ESG VM 136 and virtual appliances 128, 129. Generated route table RTC 306 is used to configure route tables associated with logical routers in the SDN, such as route tables RT1-RT3 304a-304c associated with HLRs 302a-302c. Route table RTC 306 thus includes entries each associating an IP address of a VCI (e.g., VA or VM) with the IP address of underlay router 147 as the next hop in the route. In the case of ESG VM 136, which may have a default IP address, the default IP address is associated with the IP address of underlay router 147 as the next hop. In the case of a VA, each of which has an IP address within a host, the IP address of the VA within the host is associated with the IP address of underlay router 147 as the next hop. Thus, route table RTC 306 generally routes all VCIs to the IP address of underlay router 147.

In step 606, CP 132 configures HLRs 302a-c for each host H1-H3 105a-c with route tables RT1-RT3 304a-c according to route table RTC 306 generated in step 604.

In step 608, router daemon 123a-c of each host H1-H3 105a-c reconfigures its corresponding route table RT1-RT3 304a-304c of corresponding HLR 302a-c based on the IP addresses of any VCIs that are local to that host. Thus, after configuration, each route table RT1-RT3 304a-c has entries that are modified to indicate that an IP address of a VCI that resides on the host is to be routed locally (i.e., does not leave the host). Entries in each route table RT1 304a, RT2 304b, RT3 304c for VCIs that are not local to the host are not changed and still associate the IP address of the VCI to the IP address of underlay router 147. Thus, if the VCI is an ESG VM that is local to a host, then the router daemon of that host modifies its route table to indicate that the ESG VM is local. If the VCI is a management virtual appliance, then the router daemon of that host modifies its route table to indicate that the management virtual appliance is local to the host.

In step 610, router daemon 123a-c in each host configures route table RTU 308 in underlay router 147 in network 146. After configuration, underlay router 147 associates the local IP address of the each VCI with the IP address of the host on which the VCI resides as the next hop in the route. In the case when the VCI is the ESG VM and the ESG VM has a default IP address, the router daemon 123a-c of the host 105a-c with the ESG VM modifies route table RTU 308 of underlay router 147 to associate the default IP address with IP address of the host on which the ESG VM resides. In the case when the VCI is a management appliance, router daemon 123a-c modifies route table RTU 308 of underlay router 147 to associate the IP address of the VCI with the host on which the VCI resides as the next hop. Thus, underlay route table RTU 308 associates the IP addresses of the VCIs with the hosts on which they reside.

The result of steps 602-610 is that combination of route table RTU 308 and route tables RT1 304a, RT2 304b, RT3 304c provide the correct routing to each VCI that is on a particular host. After configuration, RTU 308 provides the host on which a VCI resides and route tables RT1 304a, RT2 304b, RT3 304c in each host provides the local routing to a VCI if the VCI is local to the host and to underlay router 147 if the VCI is not local to the host.

To illustrate the state of the route tables for a particular configuration of VCIs, after the operations of FIG. 6, assume that network interfaces of host H1 105a, host H2 105b, and host H3 105c reside at network IP addresses 192.168.1.1, 192.168.1.2, and 192.168.1.3 respectively in underlay network 146 and that the network IP address for underlay router 147 is at 192.168.1.10. Further, assume that the IP address of ESG VM 136 is 10.10.1.1 in host H2 105b in which it resides.

Table 1 shows route table RTC 306. The table indicates that the default IP address 0.0.0.0/0 next hop is to underlay router 147 in network 146 at IP address 192.168.1.10 and that local overwriting of the next hop is allowed, such as by router daemons 123a-c in host H1 105a, host H2 105b, host H3 105c.

Table 2 shows route table RTU 308. This table indicates that the default IP address 0.0.0.0/0 is routed to 192.168.1.2, which is the IP address of host H2 105b, which is where ESG VM 136 resides. Thus, all destinations with the default IP address are routed to host H2 105b.

Table 3 shows route tables RT1 304a and RT3 304c. RT1 304a and RT3 304c indicate that IP address 0.0.0.0/0 (the default address, which is used for routing to the ESG VM 136) should be routed to 192.168.1.10, which is underlay router 147 in network 146. Thus, for host H1 105a and host H2 105b, all destinations with the default IP address are routed to underlay router 147 because the VCI with the default IP address is not present on host H1 105a and host H3 105c.

Table 4 shows route table RT2 304b and indicates that ESG VM 136 is located on subnet 208 in host H2 105b. In particular, as discussed with respect to step 608, since ESG VM 136 resides on host H2 105b, router daemon 123b overwrites the default route for ESG VM 136 in RT2 304b to be the IP address of ESG VM 136, which is 10.10.1.1.

TABLE 1

| RTC | | |
|---|---|---|
| Route | Next Hop | Local Overwrite |
| 0.0.0.0/0 | 192.168.1.10 | Yes |

TABLE 2

| RTU | |
|---|---|
| Route | Next Hop |
| Default Route 0.0.0.0/0 | 192.168.1.2 |

TABLE 3

| RT1, RT3 | |
|---|---|
| Route | Next Hop |
| 0.0.0.0/0 | 192.168.1.10 |

TABLE 4

| RT2 | |
|---|---|
| Route | Next Hop |
| 0.0.0.0/0 | 10.10.1.1 |

Thus, the combination of route tables RTU 308 and RT1 304a, RT2 304b and RT3 304c causes the routing of destinations with the default IP address to be routed to host H2 105b. Route table RTU 308 routes destinations with the default IP address to host H2 105b. Route table RT1 304a routes destinations with the default IP address to underlay router 147 because the default address does not reside on host H1 105a. Route table RT3 304c routes destinations with the default IP address to underlay router 147 because the default IP address does not reside on host H3 105c. Route table RT2 304b routes destinations with the default IP address to ESG VM 136 on host H2 105b because ESG VM 136 resides on host H2 105b.

Figure 7:
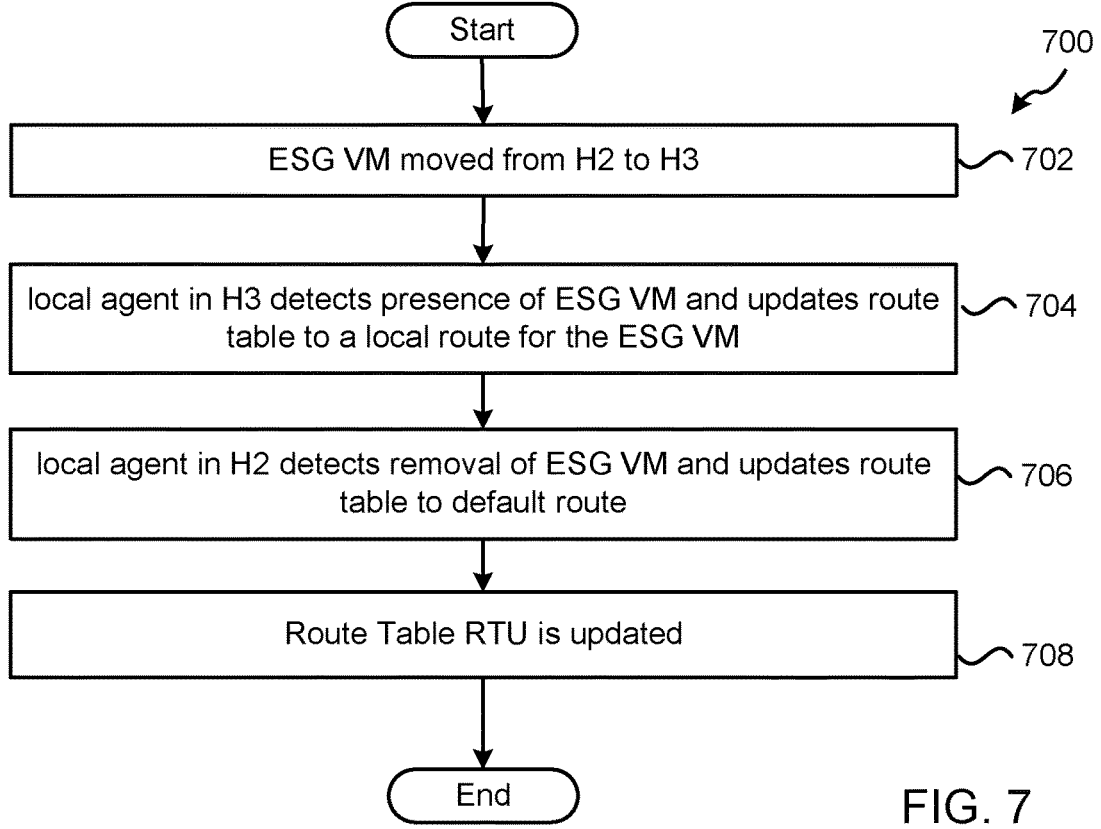
FIG. 7 depicts a flow of operations for configuring route tables for the hosts after the ESG virtual machine is moved.

FIG. 7 depicts a flow of operations for configuring the route table for each of the hosts after ESG VM 136 is moved from H2 105b to H3 105c. Step 702 causes the steps of FIG. 6 to occur so that the control plane is notified of the change and transmits updated route tables to RT1-RT3 304a-c and RTU 308. In step 704, router daemon 123c of host H3 105c detects the presence of ESG VM 136 on a subnet 210 of host H3 105c. In step 704, router daemon 123c of host H3 105c updates corresponding route table RT3 304c to reflect that ESG VM 136 is local to host H3 105c on subnet 210, overwriting the default route entry next hop of 192.168.1.10 with the IP address 10.10.1.1 of ESG VM 136. In step 706, router daemon 123b of host H2 105b detects the removal of ESG VM 136 and updates corresponding route table RT2 304b with the default route next hop of 192.168.1.10. In step 708, router daemon 123a-c in each host H1-H3 105a-c updates an entry in route table RTU 308.

Tables 5, 6 and 7 show route tables RT2 304b, RTU 308, and RT3 304c respectively, after ESG VM 136 is moved. Table 5 corresponding to route table RT2 304b, which was modified by router daemon 123b in step 706, now indicates that the default route to ESG VM 136 is to underlay router 147 in network 146. Table 6 corresponding to route table RTU 308, which was modified by router daemon 123b in step 708, indicates that route to ESG VM 136 is to host H3 105c. Thus, RT2 304b and RTU 308 now combine to send ESG VM 136 destination traffic to host H3 105c. Table 7 corresponding to route table RT3 304c, which was modified by router daemon 123c in step 704, now indicates that traffic whose destination is ESG VM 136 is routed locally to the IP interface of ESG VM 136. Route table RT1 304a is unchanged.

TABLE 5

| RT2 | |
|---|---|
| Route | Next Hop |
| 0.0.0.0/0 | 192.168.1.10 |

TABLE 6

| RTU | |
|---|---|
| Route | Next Hop |
| default route | 192.168.1.3 |

TABLE 7

| RT3 | |
|---|---|
| Route | Next Hop |
| 0.0.0.0/0 | 10.10.1.1 |

Figure 8:
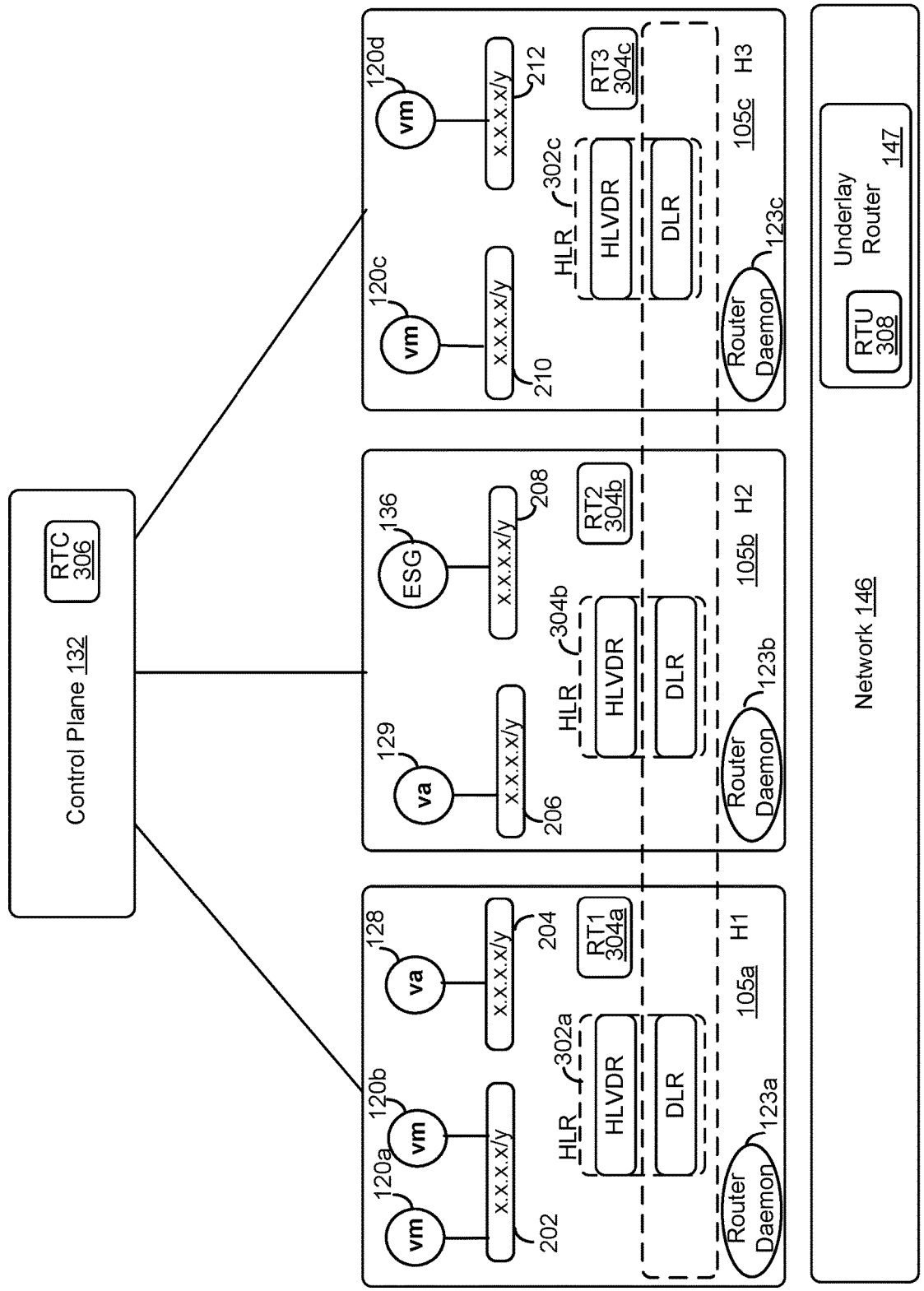
FIG. 8 depicts a physical view of various hosts with management virtual machines and routers in the data center, in an embodiment.

FIG. 8 depicts a physical view of various hosts with management virtual machines and routers in the data center, in an embodiment. In the figure, host H1 105a includes a VA 128 (e.g., network manager VM) on subnet 204 at IP 10.10.1.5. Host H2 105b includes a VA 129 on subnet 206 at 10.10.1.6. Due to the steps in FIG. 6, the management plane was notified of the current IP addresses of VAs 128, 129 in host H1 105a, host H2 105b, and host H3 105c. Accordingly, route table RTC 306 generated by the control plane is as shown in Table 8.

TABLE 8

| RTC | | |
|---|---|---|
| Route | Next Hop | Local Overwrite |
| 10.10.1.5/32 | 192.168.1.10 | Yes |
| 10.10.1.6/32 | 192.168.1.10 | Yes |

Table 9 shows route Table RTU 308.

TABLE 9

| RTU | | |
|---|---|---|
| | Route | Next Hop |
| | Default Route | 192.168.1.2 |
| VA 128 | 10.10.1.5/32 | 192.168.1.1 |
| VA 129 | 10.10.1.6/32 | 192.168.1.2 |

Thus, RTU 308 indicates that VA 128 is located in host H1 105a; and that VA 129 is located in host H2 105b.

Table 10 shows Route Table RT1 304a. RT1 304a indicates that VA 128 is local to host H1 105a.

TABLE 10

| RT1 | |
|---|---|
| Route | Next Hop |
| 10.10.1.5/32 | local |
| 10.10.1.6/32 | 192.168.1.10 |

Table 11 shows route table RT2 304b. The table indicates that VA 129 is local to host H2 105b.

TABLE 11

| RT2 | |
|---|---|
| Route | Next Hop |
| 10.10.1.5/32 | 192.168.1.10 |
| 10.10.1.6/32 | local |

Table 12 shows route table RT3 304c, which indicates that VA 128 and VA 129 are accessible via network 146.

TABLE 12

| RT3 | |
|---|---|
| Route | Next Hop |
| 10.10.1.5/32 | 192.168.1.10 |
| 10.10.1.6/32 | 192.168.1.10 |

Thus, the route tables depicted in Tables 8-12 indicate the locations of the management appliances after the flow of operations depicted in FIG. 6 so that the route tables reflect the current locations of the management appliances.

Figure 9:
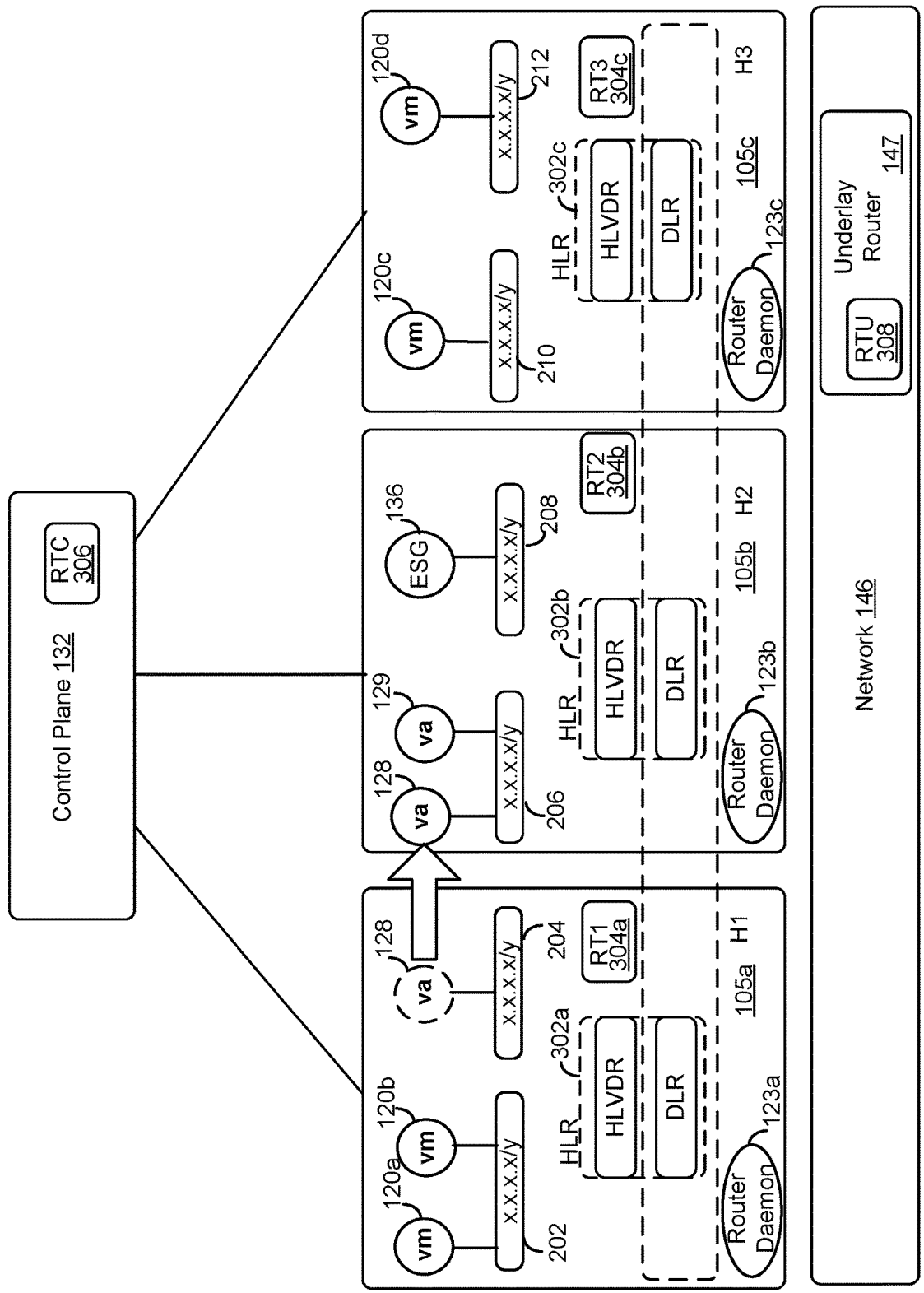
FIG. 9 depicts a physical view of various hosts with movement of a management virtual machine in the data center, in an embodiment.

FIG. 9 depicts a movement of a VA from host H1 105a to host H2 105b. In FIG. 8, VA 128 resided on a subnet 204 in host H1 105a but has been moved to subnet 206 on host H2 105b.

Figure 10:
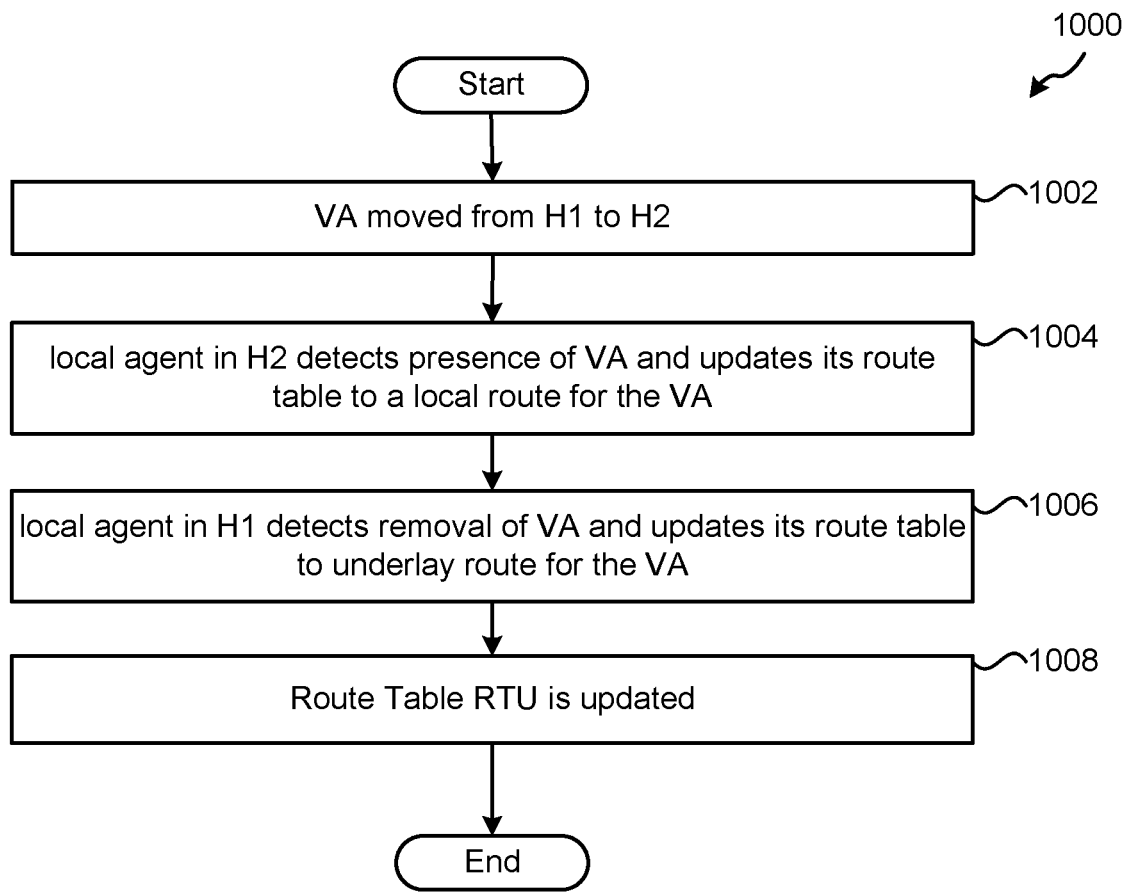
FIG. 10 depicts a flow of operations for configuring route tables for the hosts that reflect the physical location of the various management virtual machines after being moved.

FIG. 10 depicts a flow of operations for configuring route tables for the hosts that reflect the physical location of the various management virtual machines after being moved, as depicted in FIG. 9. Step 1002 triggers the operations of FIG. 6, which then generates a new RTC 306 and transmits the new RTC 306 to the HLRs 302a-c. In step 1004, router daemon 123b detects the presence of VA 128 in host H2 105b and updates route table RT2 304b to indicate that destinations specifying VA 128 are to be routed locally. In step 1006, router daemon 123a detects the removal of VA 128 in host H1 105a and updates route table RT1 304a to indicate that destinations specifying VA 128 are to be routed to the underlay. In step 1008, router daemon 123b updates an entry in RTU 308 to indicate that destinations specifying VA 128 are to be routed to host H2 105b.

Table 13 shows the state of route table RTC 306 after moving VA 129 and after the operations of FIG. 6.

TABLE 13

| RTC | | |
|---|---|---|
| Route | Next Hop | Local Overwrite |
| 10.10.1.5/32 | 192.168.1.10 | Yes |
| 10.10.1.6/32 | 192.168.1.10 | Yes |

Table 14 shows route table RT1 304a, which was modified router daemon 123a in step 1006, after the move. The table indicates that destination addresses for VA 128 and VA 129 are routed to underlay router 147 because VA 128 and VA 129 are not local to host H1 105a.

TABLE 14

| RT1 | |
|---|---|
| Route | Next Hop |
| 10.10.1.5/32 | 192.168.1.10 |
| 10.10.1.6/32 | 192.168.1.10 |

Table 15 shows route table RT2 304b, which was modified by router daemon 123b in step 1004, after the move. The table indicates that both VA 128 and VA 129 are local to host H2 105b.

TABLE 15

| RT2 | |
| --- | --- |
| Route | Next Hop |
| 10.10.1.5/32 | local |
| 10.10.1.6/32 | local |

Table 16 shows route table RT3 304c. The table indicates that destination addresses for VA 128 and VA 129 are routed to underlay router 147. As shown, there is no update to RT3 304c.

TABLE 16

| RT3 | |
| --- | --- |
| Route | Next Hop |
| 10.10.1.5/32 | 192.168.1.10 |
| 10.10.1.6/32 | 192.168.1.10 |

Table 17 shows the route table for underlay router 147 in network 146. The table indicates that destination addresses for VA 128 and VA 129 are routed to host H2 105b.

TABLE 17

| RTU | | |
| --- | --- | --- |
| | Route | Next Hop |
| | Default Route | 192.168.1.2 |
| VA 128 | 10.10.1.5/32 | 192.168.1.2 |
| VA 129 | 10.10.1.6/32 | 192.168.1.2 |

Thus, route tables depicted in Tables 14-17 show the results after VA 128 is moved. Route table RT2 304b and route table RTU 308 combine to route destinations with the IP address of VA 128 to host H2 105b. Route table RT1 304a, RT3 304c and RTU 308 combine to route destinations with the IP address of VA 128 to underlay router 147 which in turn routes those destinations to host H2 105b, where VA 128 now resides.

Accordingly, the aspects described herein provide a technical solution to a technical problem associated with moving VCIs among hosts in a data center that is implemented on a network provided by a cloud provider. More specifically, implementing the aspects herein allow for the free movement of the VCIs among the hosts in the data center even though the network of the cloud provider does not track the layer 2 addresses of the VCIs on the various hosts.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing route tables in a data center for virtual routers of an overlay network and an underlay network router of an underlay network, the data center comprising a plurality of hosts, each of the plurality of hosts including one or more virtual compute instances (VCIs) and a virtual router, the plurality of hosts being coupled to the underlay network, each VCI and each of the plurality of hosts having a corresponding IP address, the method comprising:

generating a route table, the route table including at least one entry including a first entry associating a first route corresponding to a first VCI on a first host to a first next hop indicating an IP address of the underlay network router; and transmitting the generated route table to each of the plurality of hosts, wherein each of the plurality of hosts accepts the generated route table as a route table of its corresponding virtual router, wherein the first host updates the first entry in the route table of its corresponding virtual router to update the first next hop to indicate the first VCI is local to the first host, and wherein the first host updates a route table of the underlay network router with an entry associating the first route to a next hop indicating an IP address of the first host.

2. The method of claim 1, wherein the generated route table includes in the first entry a field that allows a host to overwrite the first entry in its corresponding route table.

3. The method of claim 1, wherein the generated route table is generated based on IP addresses of VCIs received from each host, the VCIs being local to each host.

4. The method of claim 1, wherein after the first host updates the first entry:

the first VCI moves from the first host to a second host;

the first host updates the first entry in the route table of its corresponding virtual router to update the first next hop to indicate the IP address of the underlay network router based on the generated route table;

the second host updates the first entry in the generated route table of its corresponding virtual router to update the first next hop to indicate the first VCI is local to the second host; and the second host updates a route table of the underlay network router with an entry associating the first route to a next hop indicating an IP address of the second host.

5. The method of claim 1, wherein the first route indicates an IP address of the first VCI, and wherein the first VCI is a VCI configured to manage the overlay network.

6. The method of claim 1, wherein the first route indicates a default route, and wherein the first VCI is an edge services gateway.

7. The method of claim 6, wherein the first entry in the route table of the corresponding virtual router of the first host is updated with the first next hop to indicate the IP address of the first VCI.

8. A data center comprising:

an underlay network that includes an underlay router;

a plurality of hosts coupled to the underlay network, each host having one or more CPUs and a RAM coupled to the one or more CPUs, each host including one or more virtual compute instances (VCIs) and a virtual router loaded in the RAM and run by the one or more CPUs, the virtual router performing routing in an overlay network, and each VCI and each of the plurality of hosts having a corresponding IP address;

a controller in a control plane, wherein the controller is configured to:

generate a route table, the route table including at least one entry including a first entry associating a first route corresponding to a first VCI on a first host to a first next hop indicating an IP address of the underlay network router; and transmit the generated route table to each of the plurality of hosts, wherein each of the plurality of hosts accepts the generated route table as a route table of its corresponding virtual router, wherein the first host updates the first entry in the route table of its corresponding virtual router to update the first next hop to indicate the first VCI is local to the first host, and wherein the first host updates a route table of the underlay network router with an entry associating the first route to a next hop indicating an IP address of the first host.

9. The data center of claim 8, wherein the generated route table includes in the first entry a field that allows a host to overwrite the first entry in its corresponding route table.

10. The data center of claim 8, wherein the generated route table is generated based on IP addresses of VCIs received from each host, the VCIs being local to each host.

11. The data center of claim 8, wherein after the first host updates the first entry:
- the first VCI moves from the first host to a second host;
- the first host updates the first entry in the generated route table of its corresponding virtual router to update the first next hop to indicate the IP address of the underlay network router based on the generated route table;
- the second host updates the first entry in the generated route table of its corresponding virtual router to update the first next hop to indicate the first VCI is local to the second host; and
- the second host updates a route table of the underlay network router with an entry associating the first route to a next hop indicating an IP address of the second host.

12. The data center of claim 8,
- wherein the first route indicates an IP address of the first VCI, and
- wherein the first VCI is a VCI configured to manage the overlay network.

13. The data center of claim 8,
- wherein the first route indicates a default route, and
- wherein the first VCI is an edge services gateway.

14. The data center of claim 8, wherein the first entry in the route table of the corresponding virtual router of the first host is updated with the first next hop to indicate the IP address of the first VCI.

15. A non-transitory computer-readable medium comprising instructions executable in a computer system, wherein the instructions when executed in the computer system cause the computer system to carry out a method of managing route tables in a data center for virtual routers of an overlay network and an underlay network router of an underlay network, the method comprising:
- generating a route table, the route table including at least one entry including a first entry associating a first route corresponding to a first VCI on a first host to a first next hop indicating an IP address of the underlay network router; and
- transmitting the generated route table to each of the plurality of hosts,
- wherein each of the plurality of hosts accepts the generated route table as a route table of its corresponding virtual router,
- wherein the first host updates the first entry in the route table of its corresponding virtual router to update the first next hop to indicate the first VCI is local to the first host, and
- wherein the first host updates a route table of the underlay network router with an entry associating the first route to a next hop indicating an IP address of the first host.

16. The non-transitory computer-readable medium of claim 15, wherein the generated route table includes in the first entry a field that allows a host to overwrite the first entry in its corresponding route table.

17. The non-transitory computer-readable medium of claim 15, wherein after the first host updates the first entry:
- the first VCI moves from the first host to a second host;
- the first host updates the first entry in the generated route table of its corresponding virtual router to update the first next hop to indicate the IP address of the underlay network router based on the generated route table;
- the second host updates the first entry in the route table of its corresponding virtual router to update the first next hop to indicate the first VCI is local to the second host; and
- the second host updates a route table of the underlay network router with an entry associating the first route to a next hop indicating an IP address of the second host.

18. The non-transitory computer-readable medium of claim 15,
- wherein the first route indicates an IP address of the first VCI, and
- wherein the first VCI is a VCI configured to manage the overlay network.

19. The non-transitory computer-readable medium of claim 15,
- wherein the first route indicates a default route, and
- wherein the first VCI is an edge services gateway.

20. The non-transitory computer-readable medium of claim 15, wherein the first entry in the route table of the corresponding virtual router of the first host is updated with the first next hop to indicate the IP address of the first VCI.

* * * * *